(12) United States Patent
Lessing

(10) Patent No.: US 8,601,889 B2
(45) Date of Patent: Dec. 10, 2013

(54) TELESCOPING DUAL-SPINDLE DRIVE

(75) Inventor: Carsten Lessing, Deilingen (DE)

(73) Assignee: weiss Präzisionstechnik GmbH & Co. KG, Deilingen (DE)

( * ) Notice: Subject to any disclaimer, the term of this patent is extended or adjusted under 35 U.S.C. 154(b) by 340 days.

(21) Appl. No.: 12/505,248

(22) Filed: Jul. 17, 2009

(65) Prior Publication Data

US 2010/0018334 A1    Jan. 28, 2010

(30) Foreign Application Priority Data

Jul. 18, 2008 (DE) .......................... 10 2008 033 887

(51) Int. Cl.
*F16H 3/06* (2006.01)
*F16H 27/02* (2006.01)
*F16H 29/02* (2006.01)

(52) U.S. Cl.
USPC .......................... 74/89.35; 74/89.34; 74/89.37

(58) Field of Classification Search
USPC ................ 74/89.23–89.42; 248/125.1, 125.8; 254/102
See application file for complete search history.

(56) References Cited

U.S. PATENT DOCUMENTS

| | | | | |
|---|---|---|---|---|
| 1,532,702 A | * | 4/1925 | Lane | 254/102 |
| 6,880,416 B2 | * | 4/2005 | Koch | 74/89.35 |
| 7,185,868 B2 | * | 3/2007 | Wang | 248/422 |
| 7,424,833 B2 | * | 9/2008 | Fich et al. | 74/89.35 |
| 7,712,389 B2 | * | 5/2010 | Wang | 74/89.23 |
| 7,752,932 B2 | * | 7/2010 | Chen et al. | 74/89.22 |
| 2007/0295126 A1 | * | 12/2007 | Wang | 74/89.35 |
| 2008/0028878 A1 | * | 2/2008 | Wang | 74/89.35 |

* cited by examiner

*Primary Examiner* — Alan Waits
(74) *Attorney, Agent, or Firm* — Cozen O'Connor

(57) ABSTRACT

The present invention pertains to a linear drive and to adjustable units with a linear drive. The linear drive includes a central, drivable connecting element, a stationary first element in working connection with the connecting element, and a stationary second element in working connection with the connecting element and arranged axially opposite the first element. The first and second elements are connected to the connecting element by corresponding pairs of threads. The pairs of threads are designed as oppositely threaded pairs to create a compact, essentially three-part linear drive capable of maximum travel distance.

20 Claims, 3 Drawing Sheets

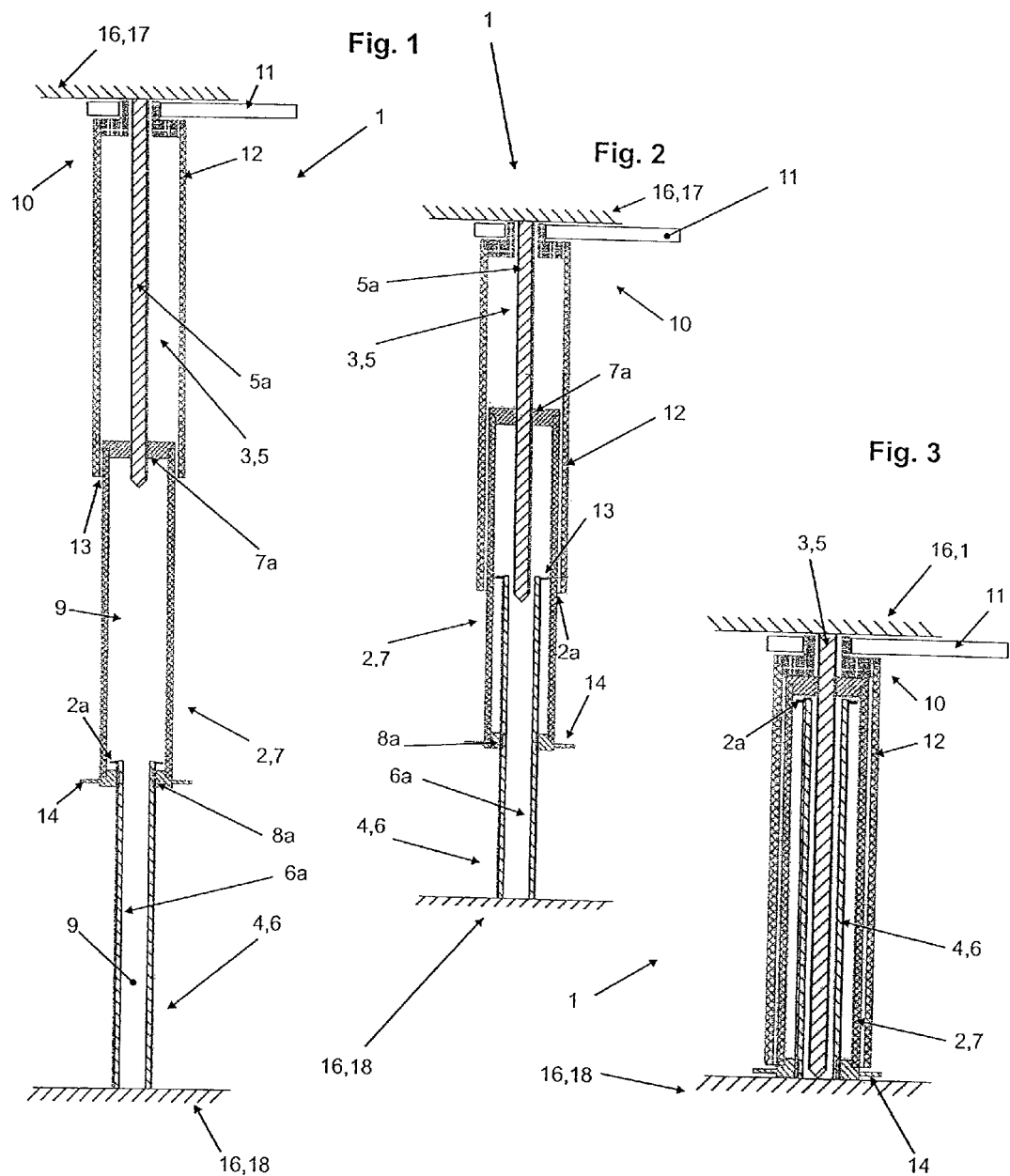

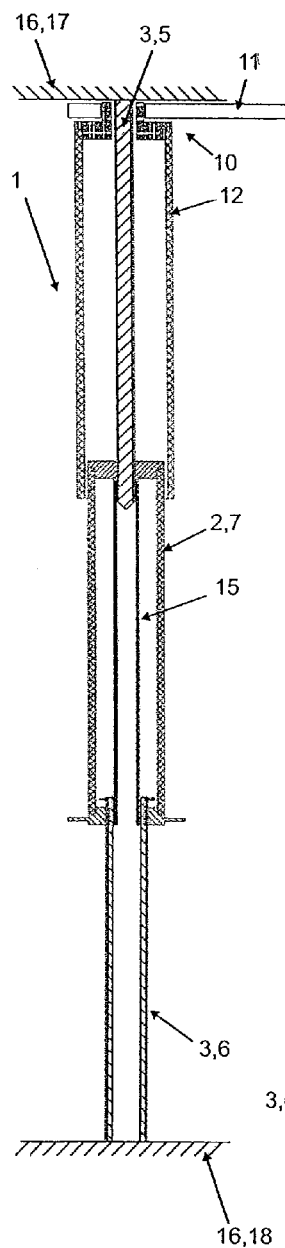
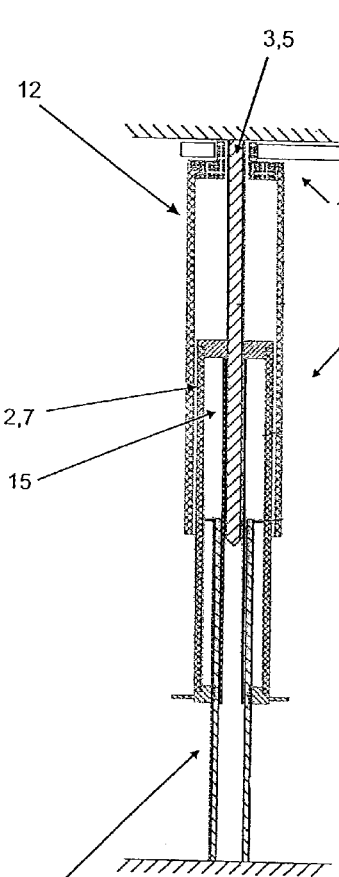
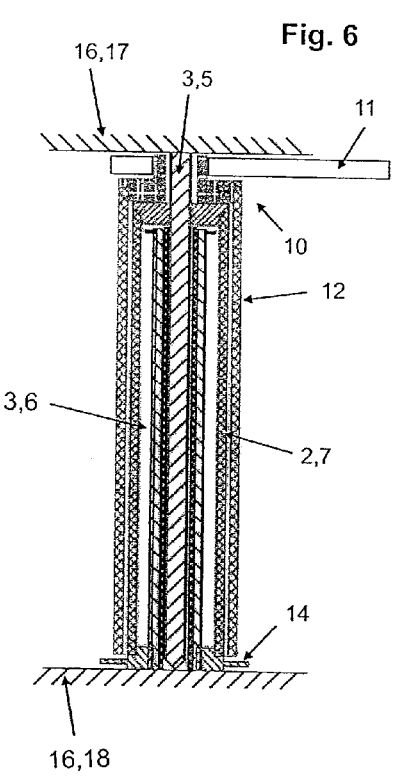

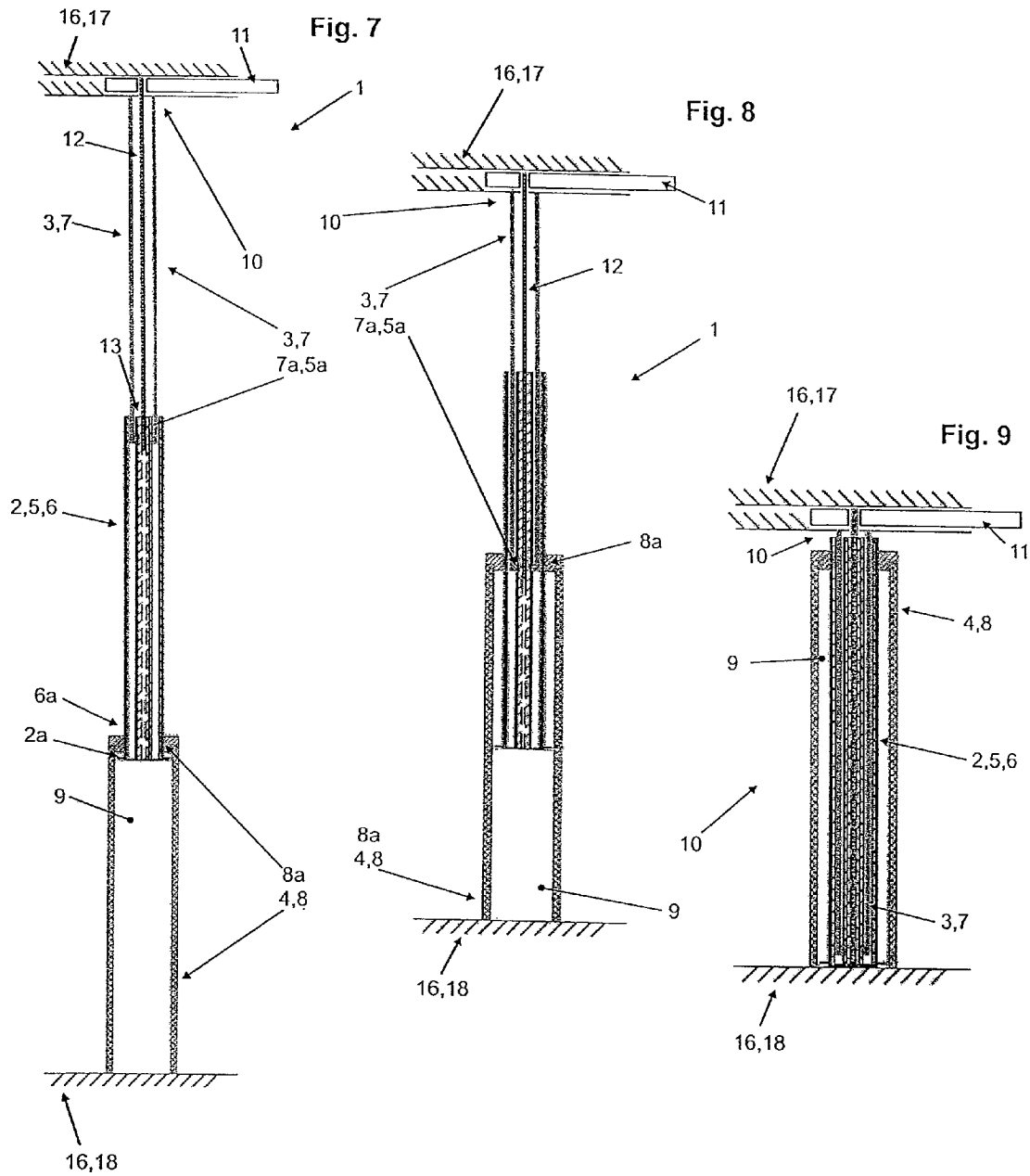

TELESCOPING DUAL-SPINDLE DRIVE

CROSS REFERENCE TO RELATED APPLICATIONS

Priority is claimed to German Patent Application No. 10 2008 033 887.7, filed Jul. 18, 2004, the entirety of which is incorporated herein by reference.

BACKGROUND OF THE INVENTION

1. Field of the Invention

The invention pertains to a linear drive, especially to a spindle drive. The invention also pertains to an adjustable unit with a linear drive.

2. Background Information

Various linear drives are known generally from the prior art. A lifting device is known from DE 2920133 B1 with at least two threaded spindles, which extend outward from each other in telescoping fashion and cooperate with rotatable nuts, which can be shifted in their positions along the threaded spindles. A first threaded spindle is driven, wherein the second threaded spindle is driven by the first threaded spindle, which acts by way of a slideway, the second threaded spindle being supported on the first threaded spindle. The two threaded spindles, which, when in their retracted state, extend essentially over the entire length of the lifting device, are arranged directly inside each other, wherein the threaded spindles are connected to each other by a tongue-and-groove guide or by a multi-cornered ring guide so that they are free to move (shift) in the axial direction but are unable to rotate with respect to each other.

The lifting device is relatively complex in design and requires a large number of parts. In addition, the device is driven exclusively by way of the first threaded spindle.

SUMMARY OF THE INVENTION

An object of the present invention is to create a linear drive and furniture pieces with linear drives in which a simple design, especially a design with only a few components, is realized.

Advantageous elaborations of the invention are explained below in conjunction with the description of the figures.

The invention relates to a linear drive, especially a spindle drive, the linear drive comprising:
  a central, drivable connecting element,
  a first element, in particular a nonrotatable element, which is in working connection with the connecting element, and
  a second element, in particular a stationary element, which is in working connection with the connecting element and which is arranged axially opposite the first element,
  wherein the first and second elements are connected to the connecting element by appropriate pairs of threads, and the pairs of threads are designed as oppositely threaded pairs in order to create a compact, essentially three-part linear drive with maximum travel distance. "Stationary" means that the first element and the second element are designed so that they cannot rotate with respect to the connecting element. In their axial direction, the first element and the second element can be moved relative to the connecting element by rotation of the connecting element.

As a result of the pairs of threads turning in opposite directions, the linear drive can be designed as a telescoping linear drive; that is, the two opposing stationary elements can be moved away from each other, that is, shifted longitudinally in opposite axial directions, by the movable connecting element. With a central, driven connecting element of this type, a drive can be realized which makes synchronous extension possible, that is, synchronous axial movement relative to the connecting element. The elements can be designed as either hollow or solid elements.

In one embodiment of the present invention, it is provided that
  the first element is designed as a first threaded spindle with a first spindle thread,
  the second element is designed as a second threaded spindle with a second spindle thread, and
  the connecting element is designed as a spindle nut with first and second nut threads which corresponds to and cooperates with each of the two spindle threads,
  wherein a first pair of threads comprising the first spindle thread and the first corresponding nut thread turns in the opposite direction to that of a second pair of threads comprising the second spindle thread and the corresponding second nut thread.

According to another embodiment of the present invention,
  the first element is designed as a first spindle nut with a first nut thread,
  the second element is designed as a second spindle nut with a second nut thread, and
  the connecting element is designed as a threaded spindle with first and second spindle threads (spindle section), each of which corresponds to and cooperates with one of the first and second nut threads,
  wherein a first pair of threads comprising the first nut thread and the corresponding first spindle thread turns in the opposite direction to a second pair of threads comprising the second nut thread and the corresponding second spindle thread. The threaded spindle comprises two different threads. The threads can be formed one after the other on the same surface of the threaded spindle. Alternatively, the threads can be formed on different surfaces of the threaded spindle. The threads can also be superimposed on the same surface. The threaded spindle can be designed preferably as a double-threaded spindle.

In yet another embodiment of the present invention,
  the first element is designed as a first threaded spindle with a first spindle thread,
  the second element is designed as a second spindle nut with a second nut thread, and
  the connecting element is designed as a threaded nut-spindle combination with a first nut thread, which cooperates with the first spindle thread, and a second spindle thread, which cooperates with the second nut thread,
  wherein a first pair of threads comprising the first nut thread and the corresponding first spindle thread turns in the opposite direction to that of a second pair of threads comprising the second nut thread and the corresponding second spindle thread.

According to yet another embodiment of the present invention,
  the second element is designed as a first threaded spindle with a first spindle thread,
  the first element is designed as a second spindle nut with a second nut thread, and
  the connecting element is designed as a threaded nut-spindle combination with a first nut thread, which cooperates with the first spindle thread, and a second spindle thread, which cooperates with the second nut thread, where a first pair of threads comprising the first nut thread and the corresponding first spindle thread turns in the opposite direction to that of a second pair of threads comprising the second nut thread and the corresponding second spindle thread. This embodiment represents the inverse of the exemplary embodiment described just above.

There are therefore various combinations of the three components, i.e., the connecting element, the first element, and the second element, which can be used to realize the linear drive.

In another embodiment of the present invention, the first and second elements are coaxial to each other. Although the first and second elements can also be offset from each other, it is preferable for the sake of a simple design for these elements to be arranged so that they are coaxial.

In yet another embodiment of the present invention, at least one of the first and second elements is designed as a hollow element with a hollow interior space, into which the other one of the first and second elements can travel to at least some extent. In this way, it is possible to realize the maximum outward extension in a minimum amount of space. Because one of the components is arranged inside another, the height of the unit is reduced. The stroke which can be realized with the inventive linear drive is equal approximately to twice the height of the unit.

According to yet another exemplary embodiment of the present invention, the two opposite sets of threads on the pair of spindles have essentially the same pitch. Thus it is possible to realize synchronous operation, that is, synchronous extension. When the connecting element is driven, the elements are moved by essentially the same distance in the axial direction; for example, they can be moved in a ratio of 1:1. By using different pitches for the threads, it is possible to realize any other desired ratio.

In yet another exemplary embodiment of the present invention, at least one of the elements comprises a stop to limit the linear movement of the linear drive. As a result, the outward travel can be easily restricted. The stop can be movable or fixed. A suitable material for the stop is, for example, an elastic material such as rubber, hard rubber, etc. Alternatively, a solid material such as steel, metal, etc., can be selected as material for the stop. In a preferred embodiment, the stop is designed as a ring, especially as a snap ring or Seeger ring. The stop can in particular be installed so that it can be moved, that is, so that it does not occupy a permanent position, and can thus be used to adjust the linear drive. In particular, the stop can be used to set a control, for example, during initial operation or for a subsequent adjustment. In addition, the stop can be used as an aid for installation and/or assembly. The stop can be arranged in any desired position on one of the elements, such as at one end, adjacent to the connecting element, or on the end facing away from the connecting element.

According to an exemplary embodiment of the invention, the linear drive comprises at least one guide device for guiding at least one of the elements. The guide makes it possible in particular to use elongated elements, which would tend to buckle in the absence of a guide device. The guide device can also improve the running properties of the linear drive. Several guide devices can be provided. The guide device can be designed, for example, as a profiled tube, such as a profiled tube with a non-rotationally symmetric cross section. In the latter case, the guide device, especially in the form of a profiled tube with a non-rotationally symmetric cross section, can be used as a rotation-prevention device. The rotation-prevention device prevents the element in question from rotating along with the connecting element. Thus the linear drive can be attached nonrotatably by one of its elements to another component such as a piece of furniture or the like. The other element can be prevented from rotating along with the connecting element by the guide device. This is especially advantageous in cases where the linear drive is used in the leg of a table, especially in the case of rotationally symmetric table legs. If there is insufficient pressure and no guide device is provided, the element which stands on the floor can rotate when the height of the table is adjusted, with the result that abrasion marks are produced. As a result of the rotation-prevention device, the height of the table can be adjusted without allowing the element in contact with the floor or the element assigned to the floor to rotate along with the connecting element. The guide device can be designed as a support sleeve, which, for example, can absorb axial forces. No axial forces act on the guide device.

According to another exemplary embodiment of the present invention, the guide device is integrated into at least one of the elements. No separate part is required for this, which means that the linear drive can again comprise a compact design with few components. When the linear drive retracts, the guide device can be carried along also. For example, the guide device can be designed for this purpose in a telescoping manner. The installation height of the linear drive depends only on the design of the two elements and of the connecting element. If an actuating device is provided, it can be designed appropriately so that its height does not add to the height of the linear drive.

According to yet another exemplary embodiment of the present invention, at least one guide device is designed as a separate component in the connecting element. As an alternative to being provided on the element, the guide device can be provided on the connecting element. This guarantees effective guidance of the connecting element.

According to yet another exemplary embodiment of the present invention, the connecting element comprises two connecting areas a certain axial distance apart, each of which has a corresponding thread, wherein the threads are designed to be aligned axially with each other, and wherein each of the threads on the connecting areas corresponds to the thread of its associated element. The separated connecting areas are preferably separated by a distance which corresponds essentially to the length of one of the elements.

According to yet another exemplary embodiment of the present invention, the distance between the connecting areas corresponds to the length of at least one of the threads of the elements, so the that at least one of the threads of the elements can be retracted essentially into an interior space defined between the connecting areas and a connecting wall of the connecting areas. In this way, a linear drive which is very compact when in the retracted state can be realized.

In one embodiment of the present invention, furthermore, the distance corresponds essentially to an axial length of the hollow interior space.

According to another exemplary embodiment of the present invention, the connecting element comprises at least one driver device arranged on a side of the connecting wall facing away from the interior space. In order that a lifting movement can be executed, the connecting element can be connected to the component to be moved, such as a table leg, by the driver device. The linear drive has an essentially three-part design with a connecting element and two elements. If the linear drive is integrated into the leg of a table or the like, the leg will also be designed correspondingly in three parts. The middle part will then be connected by way of the driver, so that, when the height of the table leg is adjusted, the middle part or the middle parts remain in a predetermined position relative to the other two parts of the leg. In particular, the middle part is connected to the connecting elements in such a way that the middle part always remains between the two other adjacent parts of the table leg.

According to another embodiment of the present invention, an actuating device with an actuator for driving the connecting element is provided. While the first and second elements remain stationary, the connecting element can be rotated by the actuator, as a result of which the spindles are moved in the axial direction. Because only one element, namely, the connecting element, is driven, the synchronous outward travel of the spindles in opposite axial directions can be realized. By means of the pitch of the threads, it is possible, for example, to determine the ratio between the outward travel distances of the spindles or, in general, of the first and second elements. The actuator or the actuating device can be mounted directly on the connecting element. The actuator is preferably mounted on one end of the linear drive, so that the actuator can be concealed when installed in adjustable devices like tables. The connecting element is designed in such a way that neither the motor nor the connecting part are required to absorb any axial forces of the (linear drive and/or of the) driving load, and therefore is isolated by way of the connecting part from the linear drive with respect to axial forces. The actuating device can be designed in such a way that its height has no effect on the height of the linear drive. For this purpose, the actuator can comprise a corresponding through-opening, through which at least part of the linear drive can be inserted, especially one of the elements of the linear drive. Thus the actuator surrounds the linear drive. The connecting part can also be accommodated in this through-opening, so that the connecting part, too, has no effect on the height of the actuator. The connecting element can be driven by hand, also by a crank, for example, or by some other auxiliary element. An actuator designed as an electric motor or the like is preferred.

According to another exemplary embodiment of the present invention, the actuating device comprises a connecting part for connecting the actuator to the connecting element. The connecting element is driven, that is, moved, by the actuator, which acts by way of the corresponding connecting part.

According to another embodiment of the present invention, the connecting part and the connecting element each comprise corresponding engaging means for transmitting a drive force from the actuator to the connecting element. With respect to the axial forces of the linear drive, the actuating device is isolated from the linear drive by the connecting part. Like the connecting element, the connecting part can be designed as, for example, a square tube.

According to another embodiment of the present invention, the engaging means of the connecting part and the connecting element comprise a rotation-prevention device, in particular non-rotationally symmetric contours which correspond to each other. As a result, force can be transmitted between the connecting part and the connecting element without rotation therebetween after inserting the connecting element and the connecting part into each other.

According to yet another embodiment of the present invention, the connecting part is designed as a profiled tube with a hollow interior space for the at least partial accommodation of one of the elements. In this way, an extremely compact design of the linear drive can be realized, in that components are arranged in the interior space of the connecting part.

In another embodiment of the present invention, furthermore, the interior space of the connecting part comprises a length which corresponds essentially to a length of the receiving thread of the element accommodated therein.

In preferred embodiments, the connecting part can be arranged inside, that is, extending at least partially through a hollow space in the first and second elements and/or in the connecting element.

The invention also provides, in the case of an adjustable device comprising at least one first and one second adjustable part which can be adjusted relative to each other, an inventive linear drive for adjusting the adjustable device and/or adjustable units mounted thereon. The adjustable unit can be a furniture unit, an automotive unit, a lamp unit, a monitor unit, or any other type of unit in which at least two components are to be moved axially with respect to each other in a controlled manner.

In one embodiment of the present invention, the first and/or the second adjustable part has an empty space, which at least partially accommodates the linear drive. The connecting element and the elements are preferably to be arranged in this space in the adjustable part.

According to yet another embodiment of the present invention, the first, the second, or any desired adjustable part is connected adjustably to the linear drive by a driver of the linear drive. Because of its compact design, the linear drive can be easily installed in the adjustable unit.

According to yet another embodiment of the invention, the adjustable unit is designed as a piece of furniture, selected from the group comprising table legs, chair legs, bookcase legs, bed legs, bed adjustment devices, computer desks, and the like.

In summary, the linear drive consists, in the simplest case, of three components: a first element, a second element, and a connecting element between them, which connects the first and second elements together. By rotating the connecting element, the first and second elements are moved in the axial direction. The rotation can be accomplished by an actuating device. The actuating device is isolated with respect to the axial forces coming from the three previously mentioned components. The first and second elements are arranged so that they cannot rotate. This can be accomplished by means of, for example a separate rotation-prevention device, which is realized by, for example, a guide device. The linear drive with actuating device and with optional guide device requires no axial support to absorb axial loads. The linear drive can be suspended at one end by the guide device, which is designed as a rotation-prevention device, so that one of the first and second elements is suspended in a nonrotatable manner. If a rotation-prevention device lock is not provided, the first and second elements must be mounted so that they are nonrotatable or are prevented from turning. The actuating device is controlled by a controller. This can be adjusted with respect to a predetermined degree of extension by the use of, for example, a stop. It is possible in this way to set, for example, both starting and ending positions. The linear drive is designed as a telescoping drive. The three components, which can be essentially of the same length, can telescope into each other, so that a compact design in the retracted state is obtained, the drive being approximately of the same length as one of the components. The maximum lift achievable with the linear drive then corresponds approximately to twice the length of the linear drive in the retracted state. If the threads are designed appropriately (e.g., turning in opposite directions, same pitch), it is possible to realize a linear drive capable of synchronous movement.

BRIEF DESCRIPTION OF THE DRAWINGS

Additional measures which improve the invention can be derived from the following description of at least one exemplary embodiment of the invention, which is illustrated schematically in the figures. All of the features and/or advantages, including design details, spatial arrangements, and/or process steps derivable from the claims, from the description, or from the drawings can be essential to the invention either by themselves or in any of a wide variety of combinations.

In the drawings,

FIGS. 1-3 show in schematic fashion a cross-sectional side view of a linear drive in an extended state, in a partially extended or retracted state, and in a retracted state, FIGS. 4-6 show in schematic fashion a cross-sectional side view of the linear drive according to FIG. 1 with an additional guide device, and FIGS. 7-9 show in schematic fashion a different embodiment of the linear drive with two spindle nuts and a (double-) threaded spindle.

DETAILED DESCRIPTION OF THE EMBODIMENTS

FIGS. 1-3 show in schematic fashion a cross-sectional side view of a linear drive 1. The linear drive 1 is designed as a telescoping dual-spindle drive with
- a central, drivable connecting element 2;
- a first element 3, which is in working connection with the connecting element 2 and which is not driven, that is, which is stationary with respect to rotation; and
- a second element 4, which is in working connection with the connecting element 2 and which is arranged axially opposite the first element 3.

The first element 3 is designed as a first threaded spindle 5 with a first spindle thread 5a. The second element 4 is designed as a second threaded spindle 6 with a second spindle thread 6a. The second threaded spindle 6 and the connecting element 2 are in the present case designed as hollow components, in the one case as a hollow spindle and in the other case as a hollow tube, with an interior space 9, into which the first threaded spindle 5 can be at least partially retracted. Thus the second element 4 is designed essentially as a hollow cylinder. The connecting element 2, the first element 3, and the second element 4 are coaxial to each other, so that they result in a telescoping assembly. The connecting element 2, in the form of the spindle nut 7, is designed with a first nut thread 7a, which corresponds to the first element 3 or, more precisely, to the first spindle thread 5a, and with a second nut thread 8a, which corresponds to the second spindle thread 6a. The two nut threads 7a, 8a are a certain axial distance apart, wherein the distance is essentially equal to the length of one of the threads 5a, 6a of the threaded spindles 5, 6 in the longitudinal direction. The linear drive 1, furthermore, comprises an actuating device 10, which comprises an actuator 11 and a connecting part 12. The actuator 11 is in the present case designed as an (electric) motor, which drives the connecting part 12. The connecting part 12 is designed as a hollow profiled tube, which has engaging means 13 by which it engages with the connecting element 2. In the present case, the engaging means 13 are designed as non-rotationally symmetric contours. This means that the connecting part 12 is designed as a hollow profiled drive tube, which at least partially surrounds the connecting element 2 with a rotation-preventing effect, wherein the external contour of the connecting element 2 is not rotationally symmetric, nor is the internal contour of the drive tube (corresponding to the connecting part 12). For example, the profiled drive tube is designed as a square tube. The first threaded spindle 5 is arranged inside the drive tube 12 and in part of the connecting element 2. The drive tube 12 is also coaxial to the connecting element 2 and to the two threaded spindles 3 and 4. As a result of this design, a three-part linear drive 1 with actuating device 10 is formed. To support the elements 3, 4, there is no need for special bearings or bearing elements, especially axial bearings to absorb axial forces.

FIG. 1 shows the linear drive 1 essentially in its maximally extended position. To limit the outward travel, the second threaded spindle 6 comprises in the present case a stop 2a at the end situated in the connecting element 2. When the selected maximum outward travel distance is reached, this stop comes up against the inside of a corresponding section of the connecting element 2.

FIG. 2 shows the linear drive 1 according to FIG. 1 in the only partially extended or retracted position. It can be seen here that the components of the linear drive 1, i.e., the connecting element 2 and the two elements 3, 4, have telescoped into one another, which reduces the amount of space required for the linear drive 1 to a minimum. The connecting element 2 and the second threaded spindle 6, furthermore, have been retracted into the drive tube 12.

FIG. 3, finally, shows the completely retracted linear drive 1. In the longitudinal direction, that is, in the axial direction, the length of the linear drive 1 is approximately equal to the axial length of the first threaded spindle 5. In order for the linear drive 1 or, more precisely, the connecting element 2, to cooperate with additional adjustable units (not shown here), the connecting element 2 has, at the end opposite the actuator 11, a driver 14, by means of which an adjustable unit can be connected to the linear drive 1. To ensure that the telescopic extension and retraction can occur when the connecting element 2 is driven, the pair of threads between the first threaded spindle 5 and the connecting element 2 and the pair of threads between the second nut thread 8 and the second element 4 or, more precisely, between the second spindle thread 6a and the connecting element 2 or, more precisely the nut thread 8a, turn in opposite directions. This means that, in the present case, the first threaded spindle 5 comprises a right-handed thread and the second threaded spindle 6 has a left-handed thread or vice versa.

Shaded areas are shown at the upper and lower ends of the linear drives 1 in the figures. These areas represent components, for example, which are adjustable relative to each other by means of the linear drive 1, especially adjustable in the axial direction of the linear drive 1. In particular, the shaded area indicates that the actuator is in a fixed position relative to the shaded area. In particular, the shaded area represents an adjustable unit 16, which comprises a first adjustable part 17 and a second adjustable part 18, which are adjustable relative to each other, specifically in the axial direction. The adjustable unit 16 is connected to the linear drive 1 by the driver 14 and can thus be moved correspondingly. If a rotation-preventing guide device 15 (FIGS. 4-6) is provided, the linear drive does not have to be designed so that it cannot rotate relative to the shaded area 18, because the guide device 15 prevents it from rotating along with the connecting element 2.

FIGS. 4-6 show the linear drive 1 with an additional support and guide sleeve 15. Otherwise, the linear drive 1 according to FIGS. 4-6 corresponds to the linear drive according to FIGS. 1-3. The support/guide sleeve 15 is preferably arranged in the connecting element 2 and has the effect of facilitating the threading-in of the first threaded spindle 5 into the second threaded spindle 6 during the retraction of the linear drive 1. Preferably the support/guide sleeve 15 is cylindrical, so that it can be arranged in space-saving fashion in the linear drive 1.

FIGS. 7-9 show a different embodiment of the linear drive 1, wherein the connecting element 2 and the elements 3, 4 are different from those of FIGS. 1-3. The connecting element 2 in FIGS. 7-9 is designed as a drivable threaded spindle 5 or, more precisely, as a double-threaded spindle 5. The circumferentially outer area of the double-threaded spindle 5 is designed as a hollow spindle. In an inner area present therein, the double-threaded spindle 5 can be designed either as a solid threaded spindle or as a hollow threaded spindle. In FIGS. 7-9, the inner area of the double-threaded spindle 5 is designed as a hollow spindle, so that it can receive the connecting part 12 of the actuating device 10. In the outer area, the threaded spindle 5 comprises a first spindle thread 5a, which is designed as an external thread. In the inner area, the threaded spindle 5 comprises a second spindle thread 6a, which is also designed as an external thread, but which turns in the opposite direction to the other external thread. The threaded spindle 5 in FIGS. 7-9 therefore comprises two threaded spindle sections, which can constitute either a multi-part assembly or preferably a one-piece unit. The elements 3, 4 in FIGS. 7-9 are designed as spindle nuts 7, 8 or, more precisely, as stationary "end tubes", especially round or profiled tubes with corresponding nut thread sections, which cooperate with the associated, corresponding threads of the connecting element 2.

With these three components, namely, the connecting element 2, the first element 3, and the second element 4, which essentially form the linear drive 1, it is possible to realize additional embodiments with any desired combination of the components.

In a further embodiment, the linear drive 1 can be formed to have the following structure:

The first element 3 is designed as a first threaded spindle 5, especially a hollow spindle. The connecting element 2 is designed as a second threaded spindle 6, wherein the outer area is designed as a hollow spindle and the inner area as a profiled tube or profiled rod, each with an appropriate thread. The second element 4 is designed as a spindle nut 7, which comprises a corresponding nut thread 7a in an area facing the connecting element 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A linear drive having first and second ends, the linear drive comprising:
   a first element having a third end connectable to a first adjustable part, the third end defining the first end of the linear drive, the first element defining first spindle threads on a surface thereof;
   a second element having a fourth end connectable to a second adjustable part, the fourth end defining the second end of the linear drive, the second element defining second spindle threads on a surface thereof;
   a drivable connecting element comprising:
      a double nut having first and second nut threads engaging the first and second spindle threads on the first and second elements, respectively,
      such that the first and second elements are connected to the drivable connecting element by respective pairs of corresponding first and second spindle threads and first and second nut threads; and
      an actuating device to drive the drivable connecting element, the actuating device comprising an actuator at the third end of the first element, and a hollow tubular connecting part drivably coupled to the actuator and non-rotationally coupled to the drivable connecting element, the connecting part at least partially surrounding the first element;
      wherein the connecting part is engaged with the drivable connecting element to transfer a drive force from the actuator to the drivable connecting element, to cause rotation of the drivable connecting element, and
      wherein the pairs are oppositely threaded pairs, and the drivable connecting element is drivable by the actuator to rotate relative to the first and second elements to telescopically extend or withdraw the linear drive and adjust the distance between the first and second adjustable parts.

2. The linear drive of claim 1, wherein the actuator defines a through-opening receiving the third end of the first element.

3. An adjustable unit comprising:
   the linear drive of claim 1 connected to at least one of the first and second adjustable parts,
   wherein the first and second adjustable parts are adjustable relative to each other, and
   the linear drive is configured to adjust at least one of the adjustable unit and the first and second adjustable parts.

4. The linear drive of claim 1, wherein the first and second elements are coaxial to each other.

5. The linear drive of claim 1, wherein at least one of the first and second elements comprises a hollow element with an interior space, into which the other of the first and second elements is at least partially retractable.

6. The linear drive of claim 1, wherein the first and second elements comprise threaded spindles, each of the first and second spindle threads of the pairs of threads comprises substantially a same pitch, and the pair of threads on the first and second threaded spindles turn in opposite directions.

7. The linear drive of claim 1, wherein at least one of the first and second elements comprises a stop for limiting a linear movement of the linear drive.

8. The linear drive of claim 1, further comprising at least one guide device for guiding at least one of the first and second elements.

9. The linear drive of claim 8, wherein the at least one guide device is integrated into at least one of the first and second elements.

10. The linear drive of claim 8, wherein the at least one guide device comprises a separate component in the drivable connecting element.

11. The linear drive of claim 1, wherein the drivable connecting element comprises two axially separated connecting areas including said first and second nut threads, respectively, and wherein the threads on the drivable connecting element are axially aligned and correspond to the threads of the first and second elements.

12. The linear drive of claim 11, wherein a distance between the connecting areas corresponds to a length of at least one of the threads of the first and second elements, so that the at least one of the threads of the first and second elements is retractable into an interior space defined between the connecting areas and a connecting wall of the drivable connecting element.

13. The linear drive of claim 12, wherein the distance between the connecting areas corresponds substantially to an axial length of the interior space of the drivable connecting element.

14. The linear drive of claim 12, wherein the drivable connecting element comprises at least one driver device mounted on a side of the connecting wall of the drivable connecting element facing away from the interior space of the drivable connecting element.

15. The linear drive of claim 1, wherein the connecting part and the drivable connecting element each have corresponding engaging means for transmitting a drive force from the actuator to the drivable connecting element, the engaging means preventing rotation between the connecting part and the drivable connecting element.

16. The linear drive of claim 1, wherein the hollow interior space of the connecting part comprises a length corresponding substantially to a length of one of the first and second spindle threads formed on the one of the first and second elements to be accommodated.

17. The linear drive of claim 3, wherein the first and second elements are nonrotatable with respect to the first and second adjustable parts, respectively.

18. The adjustable unit of claim 3, wherein at least one of the first and second adjustable parts comprises a hollow adjustment subspace, in which the linear drive is at least partially accommodated.

19. The adjustable unit of claim 3, wherein at least one of the first and second adjustable parts is adjustably connected to the linear drive by a driver of the linear drive.

20. The adjustable unit of claim 3, wherein the adjustable unit is a piece of furniture, selected from the group consisting of: a table leg, a chair leg, a stool leg, a desk leg, a bookcase leg, a cabinet leg, a bed leg, a bed adjusting device, and a computer desk.

* * * * *